United States Patent [19]

Glantz

[11] Patent Number: 4,626,438
[45] Date of Patent: * Dec. 2, 1986

[54] PROCESS FOR MAKING SKIN-ON POTATO BOATS

[75] Inventor: Jerome J. Glantz, Tualatin, Oreg.

[73] Assignee: Lamb-Weston, Inc., Portland, Oreg.

[*] Notice: The portion of the term of this patent subsequent to Dec. 13, 2000 has been disclaimed.

[21] Appl. No.: 616,269

[22] Filed: Jun. 1, 1984

Related U.S. Application Data

[60] Continuation-in-part of Ser. No. 558,835, Dec. 7, 1983, abandoned, which is a division of Ser. No. 409,870, Aug. 20, 1982, Pat. No. 4,420,494, which is a continuation-in-part of Ser. No. 830,066, May 20, 1982, abandoned.

[51] Int. Cl.⁴ .............................................. A23L 1/217
[52] U.S. Cl. ..................................... 426/438; 426/481
[58] Field of Search ............... 426/104, 637, 438, 441, 426/481, 482, 483, 506, 514, 520, 524, 808, 279, 280

[56] References Cited

U.S. PATENT DOCUMENTS

| | | |
|---|---|---|
| 1,025,373 | 5/1912 | Cooke . |
| 2,056,884 | 10/1936 | Brunstetter . |
| 2,441,305 | 5/1948 | Wilson . |
| 3,057,732 | 10/1962 | Conrad et al. . |
| 3,743,512 | 7/1973 | Hansen . |
| 3,862,345 | 1/1975 | Westover et al. . |
| 3,870,809 | 3/1975 | Green et al. . |
| 3,937,850 | 2/1976 | Farha et al. . |
| 3,949,096 | 4/1976 | Johnson et al. . |
| 4,167,588 | 9/1979 | Willard . |
| 4,186,216 | 1/1980 | Roth . |
| 4,246,293 | 1/1981 | Larson . |
| 4,256,777 | 3/1981 | Weaver et al. . |
| 4,277,510 | 7/1981 | Wicklund et al. . |
| 4,298,627 | 11/1981 | Rains . |
| 4,420,494 | 12/1983 | Glantz .............................. 426/637 X |

FOREIGN PATENT DOCUMENTS 569914 6/1945 United Kingdom .
1568910 6/1980 United Kingdom .

*Primary Examiner*—Arthur L. Corbin
*Attorney, Agent, or Firm*—Klarquist, Sparkman, Campbell, Leigh & Whinston

[57] ABSTRACT

A method for making skin-on potato boats includes slicing raw potatoes in half along their major diameter to form potato halves with exposed cut surfaces and removing center portions of the potato halves, leaving a potato layer adjacent the potato skin. The resulting hollowed-out potato halves are blanched, parfried, and frozen for later reconstitution. Upon parfrying, the potato layer has an integrated cellular structure. The reconstituted product has an oil content within the range of about 6-11%.

12 Claims, 6 Drawing Figures

PROCESS FOR MAKING SKIN-ON POTATO BOATS

This application is a continuation-in-part of application Ser. No. 558,835, filed Dec. 7, 1983 now abandoned, which is a divisional application of Ser. No. 409,870, filed Aug. 20, 1982, now U.S. Pat. No. 4,420,494, which is a continuation-in-part of application Ser. No. 830,066, filed May 20, 1982, now abandoned.

The present invention relates generally to potato processing and more particularly to a method for preparing skin-on "potato boats," which are hollowed out potato halves used in making so-called "potato skins."

BACKGROUND OF THE INVENTION

The serving of "potato skins" has been steadily increasing in restaurants and other eating establishments. Potato skins are formed from hollowed-out potato halves or "potato boats" which typically are fried in hot oil and filled with condiments, such as cheese and the like.

Such potato boats traditionally have been prepared at the restaurant by baking and thereby partially cooking whole potatoes, slicing the potatoes in half, scooping out the center portions of the potato halves and then oil frying and/or broiling them. Prior to the slicing, the whole potatoes are indistinguishable from "baked potatoes" commonly served for dinner, although at this stage the potato boat product is partially cooked in the sense that a subsequent oil fry is desired to give the product a fried character. Similarly, potato boats have been prepared commercially for shipment to restaurants and the like by baking and thereby partially cooking whole potatoes, slicing the potatoes in half, manually or mechanically scooping out the center portions of the potato halves, and then freezing them. Again, prior to frying, the scooped-out potato halves have a cellular structure like that of a baked dinner potato.

Such processes are unsatisfactory for several reasons. First, they tend to produce a nonuniform product having a variable thickness. As a result, uneven cooking may occur from one potato boat to the next and even within a single potato boat. A potato boat or portion thereof that is too "thin" will overcook and have a texture which is too hard for desirable consumption. Conversely, a potato boat or portion thereof that is too "thick" will undercook and have a texture which is too soft.

Second, a nonuniform product makes it difficult accurately to control the yield of the product, that is, the amount of potato product relative to the quantity of condiments added. A potato boat which is too thick tastes too much like a baked potato, while a potato boat which is too thin lacks the desired consistency.

Third, the product when fried in oil is "heavy" and has a high oil perception, giving it a greasy taste. Moreover, the product tends to be flaky and prone to making the frying oil "dirty."

Fourth, the step of scooping out the center portions of the potato halves is time-consuming, and hence is not conducive to efficient, inexpensive production of potato boats in large quantities.

Fifth, the product cannot be reconstituted by baking, broiling or microwave without sacrificing the fried character of the product which makes it popular.

Finally, the center portions removed from the baked potato halves are in a soft, cooked form, and hence have little value aside from their use as a mashed potato product.

Accordingly, there is a need for a process for making skin-on potato boats having a relatively uniform shell thickness and improved product characteristics.

It is therefore one object of the invention to provide a process for preparing potato boats having a relatively uniform shell thickness.

Another object of the invention is to provide a Process which is more efficient from a production standpoint.

A further object of the invention is to provide a process that promotes even cooking of the product, as well as a high degree of yield control.

Yet another object of the invention is to provide a process that is particularly adapted for automated production of potato boats in large quantities.

Still another object of the invention is to provide a process that produces potato boats having improved product characteristics, including better color, texture, flavor, holding and storage attributes, and breakage resistance.

Another object of the invention is to provide a process in which the removed center portions constitute a valuable by-product suitable for use in a wide variety of potato products, including "french fries."

Other objects and advantages of the invention will become apparent from the following detailed description.

SUMMARY OF THE INVENTION

In one embodiment, the present invention comprises a process for preparing skin-on potato boats having improved characteristics, including a low oil content, good flavor and firm, palatable texture. Raw potatoes are sliced in half to form potato halves having an outer potato skin. Center Portions of the potato halves are removed, mechanically or otherwise, leaving a potato layer adjacent the skin. The hollowed-out potato halves are then preferably blanched and air cooled. Thereafter, they are parfried in oil, frozen and reconstituted by broiling, baking and/or frying in oil. After parfrying, the product has an average oil content of about 4–7%, by weight, with virtually all product falling within a range of about 3% to 8%. After reconstitution, the product has an average oil content of about 7–8%, with virtually all product falling within a range of about 6–11%.

DETAILED DESCRIPTION OF A PREFERRED EMBODIMENT

In accordance with the present invention, potatoes are held in storage under conventional accepted conditions, so as not to accumulate excessive amounts of sugar therein. Potatoes of the Russet Burbank variety weighing 4 to 8 ounces and having a length of 3 to 4 1/2 inches and a diameter of 1 3/4 to 2 3/4 inches are preferred. The potatoes are cleaned using a water spray or some other technique well known in the art.

The potatoes are inspected whereby defective and misshaped potatoes are removed. The peels of the potatoes are pierced with about 60–80 small holes to prevent puffing during later processing.

Figure 1:
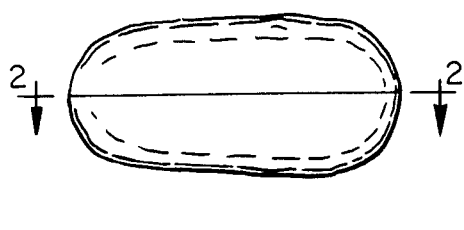
FIG. 1 is a front elevational view of a whole potato after it has been blanched and sliced lengthwise along its major diameter.
Figure 2:
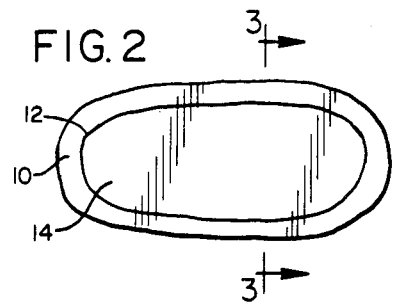
FIG. 2 is a plan view of a potato half taken along line 2—2 of FIG. 1, showing a perceptible ring distinguishing the outer gelatinized layer formed during blanching from the ungelatinized center portion.
Figure 3:
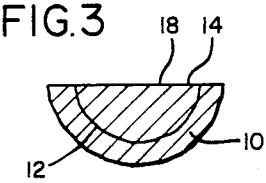
FIG. 3 is a vertical section taken along line 3—3 of FIG. 2.

The potatoes are then blanched to deactivate enzymes present therein and, as illustrated by FIGS. 2 and 3, to gelatinize a 1/8–1/2 inch outer layer or "heat ring" 10 beneath the skin. It has been found that a 1/4 inch heat ring works well. The heat ring 10 is translucent and hence is visually distinguishable from the white, opaque ungelatinized center portion 14. The potatoes preferably are blanched in water at a temperature ranging from about 170° F. to 210° F. for about 3–15 minutes. It has been found that blanching at about 190° F. for about 7 minutes works well. After blanching, the ungelatinized center portion of each potato constitutes about 25%–75% of the potato by weight depending upon the thickness of the heat ring. For example, the center portion of a potato having a 1/4 inch heat ring would constitute about 45%–52% of the potato by weight.

The blanched potatoes are cut in half lengthwise along their major diameter to form potato halves having cut surface portions 18 (FIG. 3).

Figure 4:
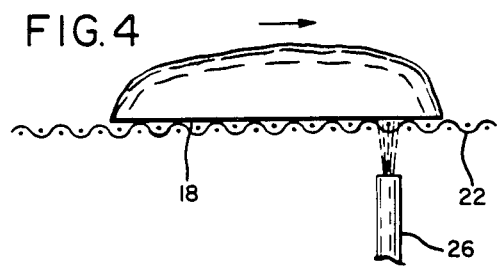
FIG. 4 is a front elevational view of one embodiment of the invention showing a potato half being passed on a conveyor screen over a blasting jet.

Embodiment of FIG. 4

In one embodiment of the process, the cut surface portions 18 are then subjected to impingement by a stream of grit-like particles, as, for example, raw potato starch particles, carried in air. This may be accomplished by passing the potato halves on a screen conveyor 22 over one or more blasting jets 26, as illustrated in FIG. 4. The impingement of the starch particles abrades away the ungelatinized center portions 14 of the potato halves, leaving intact the heat rings 10.

During the impingement process, a stream flow rate of about 100 CFM is preferred, although any flow rate sufficient to abrade away the ungelatinized potato cells will work. It is believed that the ungelatinized center portions are effectively removed because the ungelatinized potato cells shatter when impinged by the potato starch particles. The gelatinized potato cells forming the outer heat ring do not abrade away because they are more elastic and not prone to shattering.

A grit or flail may also be used as the impinging material, but the use of potato starch is advantageous inasmuch as it is a non-foreign material and readily recyclable. Other impinging materials, such as potato flour and crushed bulgur wheat, may also be used. A medium other than air may also be used to carry the abrasive material. Surface starch, grit or flail remaining on the potato halves after blasting is rinsed off with a water spray. Such starch may be recycled as an abrasive or used in other food products.

Figure 6:
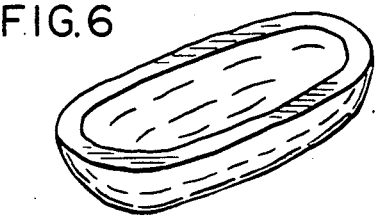
FIG. 6 is a perspective view of a potato half after the ungelatinized center portion has been removed, either by manual scooping or blasting.

After rinsing, the hollowed-out potato halves, such as the one shown in FIG. 6, are inspected and those with excessive defects or undesirable cavities are removed. Such potato halves may be frozen at this time for storage and/or transportation, but preferably are processed further as provided below.

The hollowed-out potato halves may be blanched again so as to remove any high sugars that may have developed during storage and to gelatinize any starch not converted on the initial blanching of the whole potatoes. Such blanching may be at a temperature ranging from about 150° F. to about 210° F. and for about 2–10 minutes. It has been found that blanching at about 190° F. for about 5 minutes works well.

The blanched potato halves are next air cooled at ambient temperature for about 2–10 minutes to stop the blanching action and, if necessary, to remove some of the moisture from the product and facilitate retrograding of the starch. Air cooling the potato halves at any temperature below 150° F. will stop the blanching, but cooling at about 70° F. for about 5 minutes is preferred. The potato halves may be cooled with a water spray or bath instead of air.

The cooled potato halves are then parfried in hot oil at a temperature ranging from about 325° F. to 400° F. for about 1/2–10 minutes—preferably at about 375° F. for about 5 minutes.

If prepared according to the foregoing parameters, the processed potato halves or potato boats will have a solids content of about 30% to 42%, including about 4%–7% oils, by weight, with "thinner" potato boats tending to fall into the higher end of both ranges and the "thicker" products into the lower end. They are firm, hold their shape and have a palatable texture for consumption. For purposes of storage and/or shipment they may be frozen at a temperature ranging from about −30° F. to −10° F. for about 15–30 minutes, and preferably at about −20° F. for about 20 minutes.

The frozen potato boats may be reconstituted by frying them in oil at a temperature of about 360° F. for about 3 minutes, or by other conventional methods, such as broiling or baking. They may also be reconstituted in a microwave oven, but in that event, they should be processed by a longer parfrying so that their solids content, when frozen, is greater than the 30% to 42% range.

Figure 5:
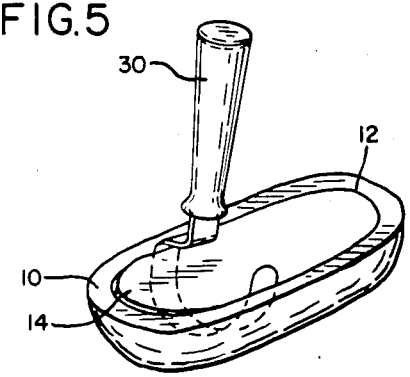
FIG. 5 is a perspective view of a second embodiment illustrating the removal of the ungelatinized center portion with a scraping device.

Embodiment of FIG. 5

In a second embodiment of the process, the potatoes are processed exactly as set forth above, except that the ungelatinized center portion 14 is manually scooped out with a scraping or cutting device 30, as shown in FIG. 5, rather than being subjected to a stream of starch particles. The ring 12 provides a distinct visual guideline demarking the outer heat ring from the ungelatinized center portion, thereby enabling the scraper to produce a product having a markedly uniform product thickness in comparison to prior manually and mechanically scooped products.

Because the uncooked center portion is relatively hard, a substantial portion thereof suitable for a wide variety of uses may be removed in a single piece. A few touch-up passes with the scraping device to remove small fragments of the uncooked center portion adjacent ring 14 may be necessary.

EXAMPLE I

Russet-type potatoes having a length of about 3 3/4 inches and a major diameter of about 2 1/8 inches were washed, pierced and blanched at a temperature of about 190° F. for about 7 minutes. The potatoes were sliced in half lengthwise along their major diameter, exposing cut surfaces. Such cut surfaces were then subjected to a stream of starch particles carried in air.

A standard blasting gun or jet was used. It had a No. 6 (6/16 inch) nozzle opening positioned about 3 inches away from the cut surfaces and a No. 7 (7/32 inch) orifice. A stream flow rate of about 100 CFM at about 120 psi was utilized. A standard mixture of starch granules ranging in size from 10 to 100 microns was drawn into the air stream through a venturi located between the orifice and nozzle. The stream removed the ungelatinized center portions of the potato halves, leaving the outer heat rings intact.

The resulting hollowed-out potato halves were rinsed with a water spray and blanched at a temperature of about 190° F. for about 5 minutes. They were then cooled at ambient temperature for about 5 minutes. Thereafter, they were parfried at a temperature of about 375° F. for about 5 minutes and subsequently frozen. The frozen potato halves were reconstituted by frying them in oil at a temperature of about 360° F. for about 3 minutes.

The resulting potato boats had crisp surfaces, mealy potato interiors, low oil perception and golden coloration. They had an average solids content of about 43%, including about 6% oils.

EXAMPLE II

Russet-type potatoes having a length predominantly between 3 and 4 1/2 inches (average of about 3 3/4 inches) and a major diameter predominantly between 1 3/4 and 2 3/4 inches (average of about 2 1/8 inches) were washed and blanched at a temperature of about 190° for about 7 minutes. The potatoes were sliced in half lengthwise along their major diameter, exposing cut surfaces.

The center portions were manually removed with a scraping device, using the ring as a visual guideline. The resulting hollowed-out potato halves were blanched at a temperature of about 190° F. for about 5 minutes, and then water cooled at about 70° F. for about 5 minutes. Thereafter they were parfried at a temperature of about 375° F. for about 5 minutes and subsequently frozen.

The resulting potato boats after reconstitution had crisp surfaces, mealy potato interiors, low oil perception and uniformly golden coloration. They were slightly thicker than the products of the previous example and had an average solids content of about 38%, including about 4.6% oils.

With each of the foregoing processes, the product when scooped and parfried has an "associated" or "integrated" cellular structure. The term "integrated" is intended to refer to a state in which a cohesive cellular structure exists bonding the potato cells together, as in the case of raw or moderately blanched (gelatinized) potato cells. It excludes potatoes having "disassociated" potato cells, as where the potatoes have been baked or blanched for a long period of time. In the case of disassociated potato cells, an integral cellular structure no longer exists. The potato cells separate and the bonds between cells break down. When the disassociation is caused by baking, the cells also dehydrate, giving them a mealy character.

It will be apparent to those skilled in the art that the gelatinized layer or heat ring formed during the initial blanching of a potato has a uniform thickness throughout. Thus, after such potato is cut in half and the ungelatinized center portion removed by the impinging particle stream, the resulting potato boat has a uniform thickness throughout. Moreover, all potato boats blanched at the same time and temperature parameters have the same thickness, regardless of variations in size. As a result of such uniformity in the product, it will be appreciated that it is easy to evenly cook and maintain high yield control during the product's preparation. Furthermore, the thickness of the product can be easily varied simply by modifying the initial blanching parameters. For example, the thickness can be increased by prolonging the initial blanching period and decreased by reducing such period.

The manual scooping embodiment does not achieve a product with quite the same degree of uniformity of thickness as the impinging particle embodiment. However, the presence of a visual guideline distinctly defining the portion of potato half to be removed enables the scraper to produce a product of relatively uniform thickness and one which achieves the advantages associated with a uniform thickness to a large extent.

The impinging particle embodiment enables potato boats to be produced efficiently and inexpensively in large quantities through the use of automated conveyors, blasting jets and potato handling equipment, and therefore with only a minimal amount of manual labor.

The manual scooping embodiment is advantageous in that the uncooked center portion is removed substantially in a single piece. Thus, such center portion is a valuable by-product suitable for a wide variety of uses and further processing.

Both embodiments produce a product having markedly improved oil perception, texture, taste and coloration in comparison to prior products. Such improvement is due primarily to processing the product in a specified manner and with defined temperature and time parameters. For example, during processing the surface of the product becomes sealed, containing the desired percentage of oil by weight. Thus, unlike prior products, very little oil is absorbed into the product during the oil fry reconstitution. Additionally, the product has a smooth, nonflaky texture. Thus, upon reconstitution there is little tendency of the product to dirty the frying oil.

Third Embodiment

In yet a third embodiment of the process, raw potatoes of the Russet Burbank variety are stored, cleaned and inspected in the manner earlier described. By virtue of its raw state, the potatoes have an integrated cellular structure. The potatoes are sliced in half lengthwise along their major diameter to form skin-on potato halves.

Thereafter, the center portions of the potato halves are removed with a mechanical apparatus or otherwise, leaving preferably a 1/4 inch potato layer adjacent the skin. The hollowed-out potato halves are blanched at a temperature ranging from about 150° F. to about 210° F. for about 2–10 minutes, to gelatinize the potato layer. Though blanched, the potato halves still have an associated or integrated cellular structure. Thereafter, the potato halves are air cooled, parfried, frozen and reconstituted in the manner earlier described.

Product prepared in the foregoing manner has an average oil content after parfrying of about 4-7%, by weight, with virtually all the product within a range of about 3% to 8%, and an average solids content within the range of about 30-42%, typically about 34-38%. Upon reconstitution, the product has an average oil content of about 7-8%, by weight, with virtually all the product falling within a range of about 6% to 11%, and a solids content within the range of about 34-48%, typically about 41-43%.

EXAMPLE III

A sample of raw Russet-type potatoes were washed and sliced in half lengthwise along their major diameter. The center portions of the potato halves were removed by hand scooping, leaving skin-on, hollowed-out potato halves having a potato layer adjacent the skin of about ¼ inch. The raw hollowed-out potato halves were blanched at a temperature of about 185° F. for about 10 minutes, parfried at a temperature of about 360° F. for about 4 minutes, and then frozen. The frozen potato boats had an average solids content of about 38.29%, including about 5.39% oils, by weight.

Another sample of potato boats, processed as just described, were reconstituted by frying them in oil at a temperature of about 360° F. for about 3 minutes. The fried potato boats had crisp surfaces, mealy potato interiors, low oil content and golden coloration. They had an average solids content of about 44.10%, including 7.68% oils, by weight.

While potato boats processed in the foregoing manner do not have all the advantages attendant with the "heat ring" processes illustrated in Examples I and II, this process is a significant improvement of prior potato boat processes for several reasons. This embodiment, as well as the embodiments earlier described, produces a product having a significantly lower oil content than prior processes, giving the product a less greasy, more palatable taste. In theory, because the hollowed-out potato halves have an integrated cellular structure when parfried, whether in a raw (Third Embodiment) or blanched (First and Second Embodiments) state, the cohesive cellular structure acts as a barrier to minimize the amount of frying oil absorbed into the product. The relatively small amount of oil that is absorbed into the product seals the surface of the product to a certain extent, thereby minimizing the absorption of any additional oil by the product when it is finish fried. Inasmuch as prior potato boat processes bake and then fry the product, the disassociated potato cells act much like a sponge to absorb a relatively large amount of frying oil.

The disassociation effect is a function of time and temperature. The point at which disassociation occurs is difficult to measure, but the difference between integrated and disassociated cellular structure is readily observable. It is roughly estimated that potato cells in the outermost layers of a potato baked at 450° F. would begin to disassociate between about 20-30 minutes. It is also roughly estimated that potato cells in the outermost layers of a potato blanched at 190° F. would begin to disassociate after about 50 minutes.

Frozen product prepared in accordance with this embodiment, as well as the other embodiments, may be reconstituted by baking, broiling or microwave, and still retain to a large extent its fried character, since the product is parfried before it is frozen and therefore contains a measurable oil content. Frozen product prepared in accordance with prior methods is not believed to contain any measurable oil content and therefore cannot be reconstituted other than by frying if the product's fried character is to be retained.

In addition, product prepared in accordance with this embodiment, as well as the other embodiments, is believed to have better storage attributes than prior products, since the oil content of the frozen product acts to preserve the product and prevent dehydration. Moreover, as with the manual scooping embodiment earlier described, the center portion is removed as a raw, virtually single piece of potato suitable for further processing into other potato products.

The foregoing advantages are not believed to be strongly influenced by omitting the blanching step(s) before parfrying. However, a blanching step is strongly preferred because it is believed that the blanch and parfry together give the product improved texture, flavor and coloration.

Those skilled in the art will appreciate that some deviation from the above procedure, including elimination of some of the steps, will still result in a satisfactory product. For example, the product need not be frozen if it is being prepared for immediate consumption. As a further example, both a mechanical scraping device and the impinging starch particles may be used to hollow-out a potato half after blanching, the scraping device being used initially to remove the innermost segment of the gelatinized portion and the starch particles being used to remove the gelatinized portion closest to the heat ring. In this way, the amount of energy used during the starch-impinging step is minimized. Similarly, the described method can be used to make "open shell" potato boats, that is, hollowed out potato boats that have been cut in half or in thirds, or whole potatoes that have been sliced in, for example, thirds or fourths and the center portions removed.

Having illustrated and described the principles of my invention by what is presently a preferred embodiment and several suggested alternatives, it should be apparent to those persons skilled in the art that such embodiments may be modified in arrangement and detail without departing from such principles.

I claim as my invention all such modifications as come within the true spirit and scope of the invention as defined by the following claims.

1. A method of preparing, from a raw, skin-on-potato, a potato boat having (1) an outer potato layer of predetermined thickness adjacent the skin, and (2) a hollowed-out center, the method comprising the steps of:
   slicing a whole, skin-on potato to form a plurality of potato sections, each having a portion of the outer potato skin thereon; thereafter
   removing a center portion of a section, leaving an outer potato layer of predetermined thickness adjacent the skin; thereafter
   parfying said potato section; and
   at some stage in the processing of said potato or potato section prior to parfying, blanching the outer potato layer thereof to gelatinize the same and thereafter maintaining the outer potato layer in a blanched gelatinized condition until parfying is commenced.

2. The method of claim 1 further comprising freezing the potato section subsequent to parfying.

3. The method of claim 2 further comprising frying the potato section subsequent to freezing to reconstitute the section.

4. The method of claim 3 wherein the reconstituted Potato section has an oil content of less than about 11% by weight.

5. The method of claim 1 further comprising cooling the potato section subsequent to blanching and prior to parfrying.

6. The method of claim 1, wherein the outer potato layer is blanched prior to slicing by blanching the raw, skin-on potato for a period of time sufficient to gelatinize at least the outer potato layer thereof.

7. The method of claim 1 wherein the potato section is parfying at a temperature within the range of about 325°–400° F. for about ½ to 10 minutes.

8. A method of preparing a potato boat comprising the steps of:
blanching a raw, skin-on potato to gelatinize at least an outer layer thereof beneath the skin of predetermined thickness; thereafter
slicing the potato into sections to form a potato section having an outer potato skin; thereafter
removing a center portion of the section, leaving the gelatinized outer layer adjacent the skin; thereafter
parfying the potato section; and
subsequent to blanching, maintaining the outer layer in a blanched gelatinized condition until parfying is commenced.

9. The method of claim 8 further comprising freezing the potato section after parfying.

10. The method of claim 9 further comprising frying the potato section subsequent to freezing.

11. A method of preparing, from a raw, skin-on potato, a potato boat having (1) an outer potato layer of predetermined thickness adjacent the skin, and (2) a hollowed-out center, the method comprising the steps of:
slicing a whole, skin-on potato in half to form a potato half having a portion of the outer potato skin thereof; thereafter
removing a center portion of the potato half, leaving an outer potato layer of predetermined thickness adjacent the skin; thereafter
parfying the potato half at a temperature within the range of about 325°–400° F. for about ½ to 10 minutes such that the resulting potato half has an oil content of less than about 8% by weight; and
at some stage in the processing of said potato prior to parfying, blanching the outer potato layer thereof to gelatinize the same and thereafter maintaining the outer potato layer in a blanched gelatinized condition until parfying is commenced.

12. The method of claim 11 further comprising freezing the potato half and thereafter frying it at a temperature within the range of about 360° F. for about 3 minutes such that the resulting potato half has an oil content of less than about 11% by weight.

* * * * *

UNITED STATES PATENT AND TRADEMARK OFFICE
CERTIFICATE OF CORRECTION

PATENT NO. : 4,626,438

DATED : December 2, 1986

INVENTOR(S) : Jerome J. Glantz

It is certified that error appears in the above-identified patent and that said Letters Patent is hereby corrected as shown below:

Column 2, line 9, "Process" should be --process--.

In the Claims:

Claim 1, column 8, line 1, "skin-on-potato" should be --skin-on potato--.
Claim 1, column 8, line 11, "parfying" should be --parfrying--.
Claim 1, column 8, line 13, "parfying" should be --parfrying--.
Claim 1, column 8, line 16, "parfying" should be --parfrying--.
Claim 2, column 8, line 2, "parfying" should be --parfrying--.
Claim 4, column 9, line 2, "Potato" should be --potato--.
Claim 7, column 9, line 2, "parfying" should be --parfrying--.
Claim 8, column 9, line 10, "parfying" should be --parfrying--.
Claim 11, column 10, line 8, "thereof" should be --thereon--.
Claim 11, column 10, line 12, "parfying" should be --parfrying--.

Signed and Sealed this

Thirty-first Day of March, 1987

Attest:

DONALD J. QUIGG

Attesting Officer     Commissioner of Patents and Trademarks